United States Patent
Jung et al.

(10) Patent No.: US 8,379,127 B2
(45) Date of Patent: Feb. 19, 2013

(54) PIXEL SENSOR ARRAY INCLUDING COMPARATOR AND IMAGE SENSOR INCLUDING THE SAME

(75) Inventors: Wun-ki Jung, Suwon-si (KR); Seog-heon Ham, Suwon-si (KR); Dong-hun Lee, Yongin-si (KR); Kwi-sung Yoo, Seoul (KR); Min-ho Kwon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 576 days.

(21) Appl. No.: 12/591,039

(22) Filed: Nov. 5, 2009

(65) Prior Publication Data

US 2010/0110256 A1 May 6, 2010

(30) Foreign Application Priority Data

Nov. 6, 2008 (KR) ........................ 10-2008-0110029

(51) Int. Cl.
 *H04N 3/14* (2006.01)
 *H04N 5/335* (2011.01)
 *H01L 31/062* (2012.01)
 *H01L 31/113* (2006.01)
(52) U.S. Cl. ........................................ 348/308; 257/292
(58) Field of Classification Search .................. None
 See application file for complete search history.

(56) References Cited

U.S. PATENT DOCUMENTS

| 6,818,933 B2 * | 11/2004 | Henderson et al. ........... 257/290 |
| 6,919,551 B2 * | 7/2005 | Barna et al. ................ 250/214 R |
| 7,911,512 B2 * | 3/2011 | Henderson .................... 348/234 |

FOREIGN PATENT DOCUMENTS

| JP | 05-206756 | 8/1993 |
| JP | 10-308902 | 11/1998 |
| JP | 2001-268443 | 9/2001 |

* cited by examiner

*Primary Examiner* — Justin P Misleh
(74) *Attorney, Agent, or Firm* — Harness, Dickey & Pierce, P.L.C.

(57) ABSTRACT

Provided are a pixel sensor array and a complementary metal-oxide semiconductor (CMOS) image sensor including the same. The pixel sensor array includes a photoelectric transformation element configured to generate electric charges in response to incident light. A signal transmitting circuit is configured to output the electric charges accumulated in the photoelectric transformation element to a first node based on a first control signal, change an electric potential of the first node to an electric potential of a second signal line based on a second control signal, and output a signal sensed in the first node to a first signal line based on a third control signal. A switch element is configured to connect a supply power terminal to the second signal line based on a fourth control signal. A comparator connected to the first signal line and the second signal line and configured to compare a voltage of the signal and a voltage of a reference signal.

18 Claims, 6 Drawing Sheets

PIXEL SENSOR ARRAY INCLUDING COMPARATOR AND IMAGE SENSOR INCLUDING THE SAME

CROSS-REFERENCE TO RELATED APPLICATION

This application claims priority to Korean Patent Application No. 10-2008-0110029, filed on Nov. 6, 2008, in the Korean Intellectual Property Office, the entire contents of which are incorporated herein by reference.

BACKGROUND

Conventional image sensors are modules for converting an optical image into an electrical signal and are widely used in digital cameras, mobile phones with built-in cameras and similar devices.

A complementary metal-oxide semiconductor (CMOS) image sensor, which is a frequently used image sensor, converts an optical image into an electrical signal via a photodiode and CMOS transistors. The CMOS image sensor may be manufactured using semiconductor manufacturing technology.

Accordingly, research and development activities related to arrangement of components and wiring design are needed in order to improve not only the general characteristics, such as power consumption, range of use of signals, and noise, of CMOS image sensors, but also integration and quality of a semiconductor manufacturing process.

SUMMARY

Example embodiments provide a pixel sensor array having improved electrical performance for sensing an image and simple wiring.

Example embodiments also provide an image sensor having improved electrical performance for sensing an image and simple wiring.

According to an example embodiment a pixel sensor array includes a photoelectric transformation element generating electric charges in response to incident light. A signal transmitting circuit transmits the electric charges accumulated in the photoelectric transformation element to a first node according to a first control signal, changes an electric potential of the first node to an electric potential of a second signal line according to a second control signal, and transmits a signal sensed in the first node to a first signal line according to a third control signal. A switch element connects or blocks a supply power terminal with or from the second signal line according to a fourth control signal. A comparator connects the first signal line and the second signal line, and compares a voltage of the signal sensed in the first node and a voltage of a reference signal.

The photoelectric transformation element may include a photodiode (PD).

The signal transmitting circuit may include a first transistor connecting the photoelectric transformation element and the first node, and transmitting the electric charges accumulated in the photoelectric transformation element to the first node according to the first control signal. A second transistor connects the first node and the second signal line, and changes the electric potential of the first node to the electric potential of the second signal line according to the second control signal. A third transistor connects the first node and the second signal line, and transmits the signal sensed in the first node to the second node. A fourth transistor connects the second node and the first signal line, and transmits a signal of the second node to the first signal line according to the third control signal.

The switch element may include a transistor connected to the second signal line and the supply power terminal and configured to turn on or block the second signal line and the supply power terminal according to the fourth control signal connected to a gate terminal.

The switch element may include a PMOS transistor for connecting the second signal line with a drain terminal, connecting the supply power terminal with a source terminal, and connecting an output terminal of the fourth control signal with a gate terminal.

In the comparator, transistors connected between the first signal line and the second signal line and transistors having a differential pair structure may be arranged in parallel between a current mirror circuit and bias current source. The reference signal may be applied to a gate terminal of a second input transistor having a differential pair relation with a first input transistor connected to the first node from among the transistors arranged in parallel between the current mirror circuit and the bias current source.

According to another example embodiment, there is provided an image sensor including a timing controller generating control signals for sensing an optical image and converting the optical image into digital image data. A pixel array transmits electric charges accumulated in photoelectric transformation elements arranged in a pixel unit according to the control signals generated in the timing controller to a first node, changes an electric potential of the first node to electric potential of a second column signal line, and transmits a signal sensed in the first node to a first column signal line. A switch element connects or blocks a supply power terminal with or from the second signal line according to the control signals generated in the timing controller. A comparator array, connected to the first column signal line and the second column signal line, compares voltage of the signal sensed in the first node of the pixel array with voltage of a reference signal. An analog-to-digital (A/D) converter converts an analog signal in the first node of the pixel array into digital data using a signal output from the comparator array.

The pixel sensor array may include a plurality of pixel units, wherein each of the pixel units includes the photoelectric transformation element. A signal transmitting circuit transmits the electric charges accumulated in the photoelectric transformation element to the first node according to a first control signal, changes an electric potential of the first node to electric potential of a second column signal line according to a second control signal, and transmits a signal sensed in the first node to a first column signal line according to a third control signal. The switch element includes a plurality of transistors connecting or blocking supply power terminal with or from the second column signal line according to a fourth control signal, wherein the first, second, third, and fourth control signals are generated by the timing controller.

The timing controller may connect the supply power terminal with the second column signal line during a pixel reset section and block the supply power terminal in the second column signal during a section where the comparator array operates, in order to convert the signal sensed in the first node of the pixel array into a digital signal.

In order to control electric charges generation time in the photoelectric transformation element, the timing controller may generate the fourth control signal having a logic value for connecting the supply power terminal with the second column signal line, the second control signal having a logic value for transiting electric potential of the first node to electric potential of the second column signal line, and the first control signal having a logic value for transmitting the electric charges generated in the photoelectric transformation element to the first node based on timing initially set in a section where the comparator array does not operate in the same column of the pixel array in one frame period.

BRIEF DESCRIPTION OF THE DRAWINGS

Example embodiments will be more clearly understood from the following detailed description taken in conjunction with the accompanying drawings in which.

DETAILED DESCRIPTION

Example embodiments will now be described more fully with reference to the accompanying drawings. Many alternate forms may be embodied and example embodiments should not be construed as limited to example embodiments set forth herein. In the drawings, the thicknesses of layers and regions may be exaggerated for clarity, and like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. Spatially relative terms, such as "beneath," "below," "lower," "above," "upper" and the like, may be used herein to describe one element or a relationship between a feature and another element or feature as illustrated in the figures. It will be understood that spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/operations noted may occur out of the order noted in the figures. For example, two figures shown in succession may in fact be executed substantially concurrently, or may sometimes be executed in reverse order, depending upon the functions/operations involved.

Hereinafter, one or more example embodiments will be described more fully with reference to the accompanying drawings.

Figure 1:
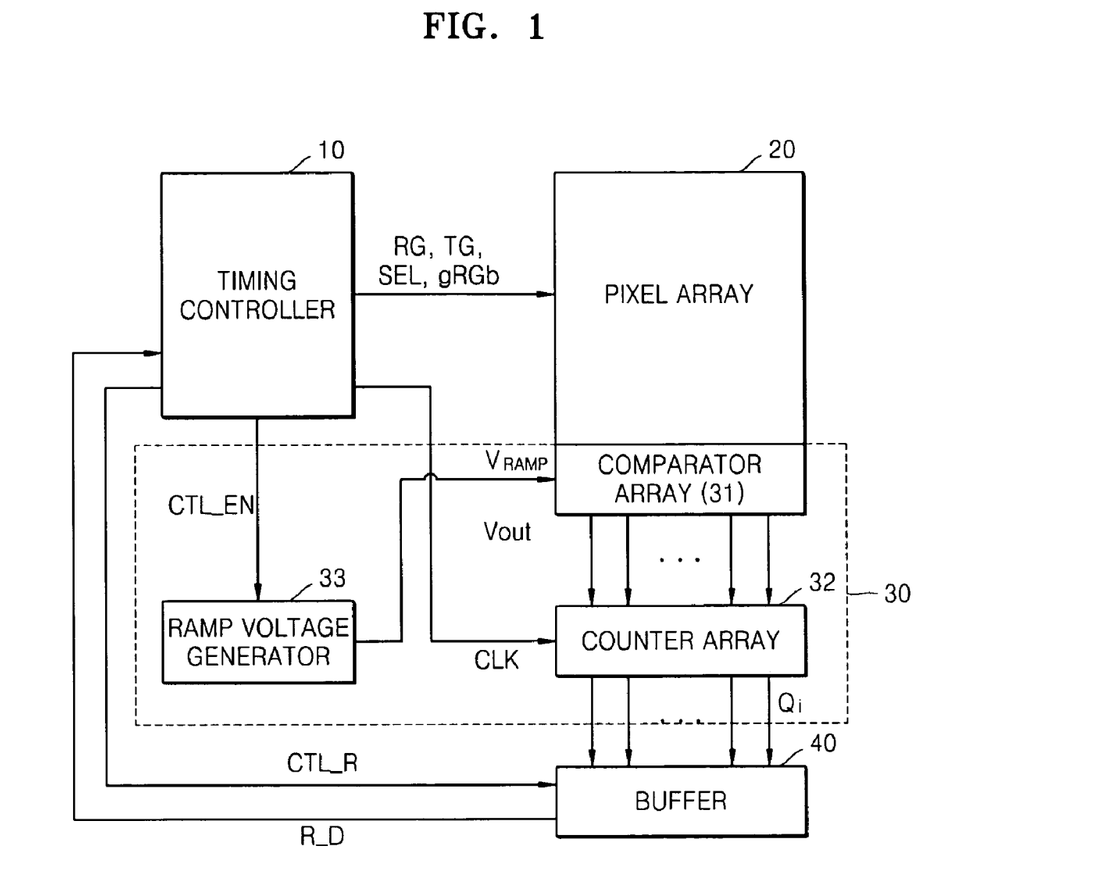
FIG. 1 is a block diagram of a complementary metal-oxide semiconductor (CMOS) image sensor according to an example embodiment.

FIG. 1 is a block diagram of a complementary metal-oxide semiconductor (CMOS) image sensor according to an example embodiment.

Referring to FIG. 1, the CMOS image sensor includes a timing controller 10, a pixel array 20, an analogue/digital (A/D) converter 30, and a buffer 40. The pixel array 20 may be also referred to as a pixel sensor array.

More specifically, the A/D converter 30 includes a comparator array 31, a counter array 32, and a ramp voltage generator 33.

The timing controller 10 generates first through fourth control signals RG, TG, SEL and gRGb for sensing an optical image and converting the optical image into digital image data.

The pixel array 20 outputs analog signals to the comparator array 31 through a column signal line. The analog signals output from the pixel array 20 are generated based on electric charges accumulated in a photoelectric transformation element of a pixel in response to the first through fourth control signals RG, TG, SEL and gRGb. The comparator array 31 compares a signal sensed in a floating diffusion (FD) node of the pixel array 20 with a ramp signal $V_{RAMP}$ generated in the ramp voltage generator 33 and generates the output signal Vout corresponding to a difference between the signal in the FD node and the ramp signal $V_{RAMP}$. The ramp voltage generator 33 may generate a ramp voltage in response to a control signal CTL_EN at a time when the comparator array 31 starts operating.

The counter array 32 performs counting according to the output signal Vout. The counter array 32 is enabled to count when the output signal Vout transits from a first logic value to a second logic value and stops counting when the output signal Vout transits from the second logic value to the first logic value.

In other words, the counter array 32 starts counting at a time corresponding to the time when the ramp signal $V_{RAMP}$ is generated and stops counting when the output signal Vout having the first logic value is generated. The output signal Vout is the first logic value when a voltage of the ramp signal $V_{RAMP}$ decreases below a voltage of the signal sensed in the FD node of the pixel array 20.

The values Qi counted in the counter array 32 are temporarily stored in the buffer 40.

The timing controller 10 reads the stored values and generates digital data corresponding to an optical image sensed in a pixel.

Figure 2:
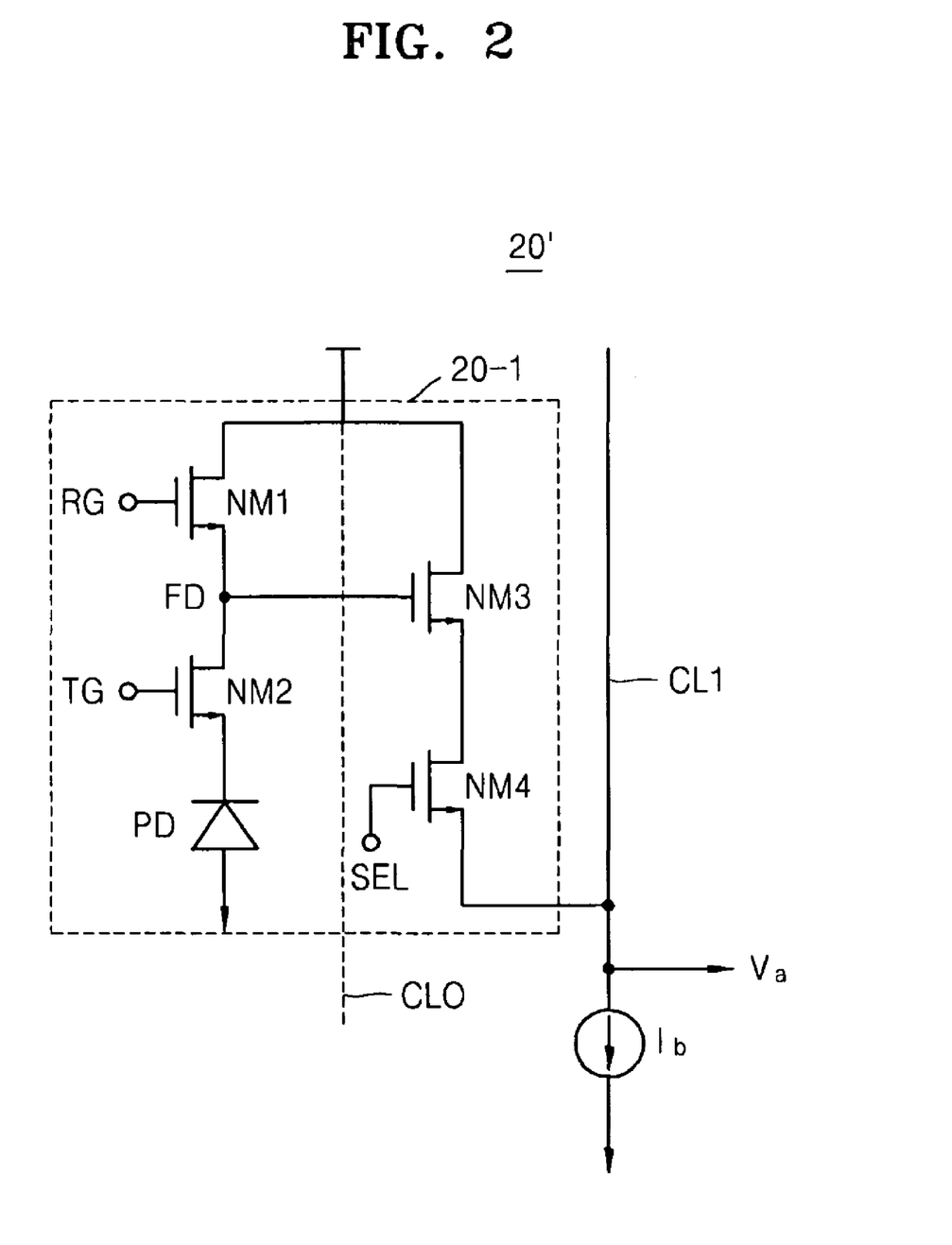
FIG. 2 is a circuit diagram of a pixel array of FIG. 1 according to an example embodiment.

FIG. 2 is a circuit diagram of a pixel array according to an example embodiment. A pixel array 20', shown in FIG. 2, may be the pixel array 20.

Referring to FIG. 2, the pixel array 20' according to an example embodiment includes a unit pixel 20-1 including a photodiode PD and four NMOS transistors NM1-NM4, and a current source Ib arranged in a column unit. The four NMOS transistors NM1-NM4 act as a signal transmitting circuit. While not illustrated, the pixel array 20' includes multiple unit pixels with the same circuitry as the unit pixel 20-1.

Power is supplied to the unit pixel 20-1 via a signal line CL0.

The NMOS transistor NM1 resets the FD node to supply a power source level to the FD node and emits electric charges stored in the FD node. The NMOS transistor NM2 transmits electric charges accumulated in the photodiode PD to the FD node. The NMOS transistor NM3 functions as a source follower. The NMOS transistor NM4 functions as a switch for switching and addressing and transmits a pixel signal to a column signal line CL1.

The NMOS transistors NM3 and NM4, and the current source Ib form a source follower and act as a buffer. Thus, the buffer is restricted by a dynamic range of the FD node input. That is, when a voltage of the FD node is a power voltage, an analog signal Va transmitted to the comparator array 31 corresponds to the value obtained by subtracting threshold voltage of the NMOS transistor NM3 from the power voltage.

In addition, the signal in the FD node passes through the NMOS transistor NM3 and the NMOS transistor NM4. Thus, noise due to the NMOS transistor NM3 and the NMOS transistor NM4 is mixed in the analog signal Va that is transmitted to the comparator array 31.

Figure 3:
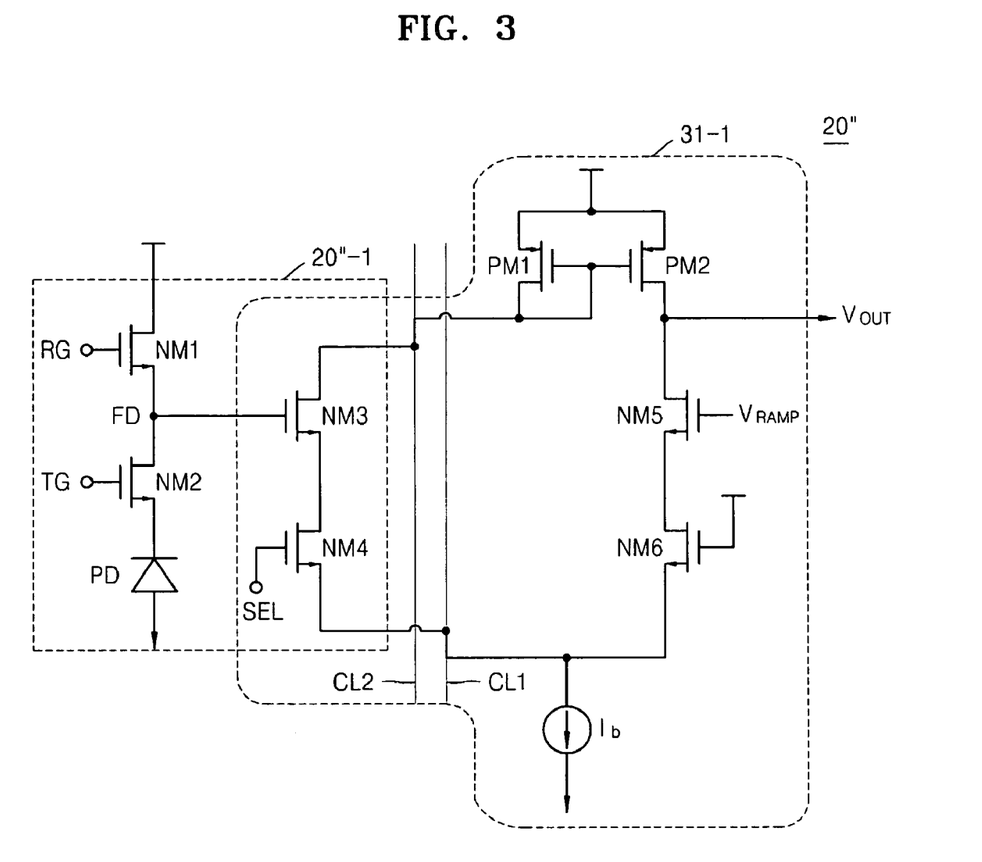
FIG. 3 is a circuit diagram of a pixel array of FIG. 1 according to another example embodiment.

FIG. 3 is a circuit diagram of a pixel array according to another example embodiment. A pixel array 20" shown in FIG. 3 may be the pixel array 20.

Referring to FIG. 3, the pixel array 20" includes unit pixels (e.g., a unit pixel 20"-1), each including a photodiode PD and four NMOS transistors NM1 to NM4, as in FIG. 2. However, the NMOS transistors NM3 and NM4 are also part of a comparator 31-1 in the comparator array 31. While not illustrated, the comparator array 31 includes a plurality of comparators with the same circuit design as the comparator 31-1.

The NMOS transistor NM1 resets the FD node to supply a power from the power supply terminal and emits electric charges stored in the FD node. The NMOS transistor NM2 transmits electric charges accumulated in the photodiode PD to the FD node.

However, the NMOS transistors NM3 and NM4 do not function as a source follower and are part of the comparator 31-1.

The comparator 31-1 includes the NMOS transistors NM3 and NM4, two NMOS transistors NM5 and NM6, two PMOS transistors PM1 and PM2, and the bias current source Ib.

A circuit formed of the PMOS transistors PM1 and PM2 is a current mirror circuit acting as an active load. In addition, the NMOS transistors NM3 and NM4 and the NMOS transistors NM5 and NM6 are arranged in parallel between the current mirror circuit and the bias current source Ib, thereby having a differential pair structure.

The comparator 31-1 compares the voltage of the FD node input to the NMOS transistor NM3 while the third control signal SEL is in a logic high state with the voltage of the ramp signal $V_{RAMP}$ input to the NMOS transistor NM5 and outputs the output signal Vout corresponding to a voltage difference.

The comparator 31-1 is arranged in a column unit in the pixel array 20 so that two column signal lines CL1 and CL2 are connected to the comparator 31-1, in addition to a power supply terminal and ground column signals.

For reference, in the pixel array 20' of FIG. 2, only one column signal line CL1 for transmitting the pixel signal to the comparator array 31 is used, in addition to a power supply terminal and ground column signals.

Accordingly, the pixel array 20" of FIG. 3 has an improved configuration in terms of power consumption, dynamic range of the signals, noise characteristic, and speed compared with the pixel array 20' of FIG. 2. However, signal wirings may be further added to the unit pixel 20"-1 in the pixel array 20".

Figure 4:
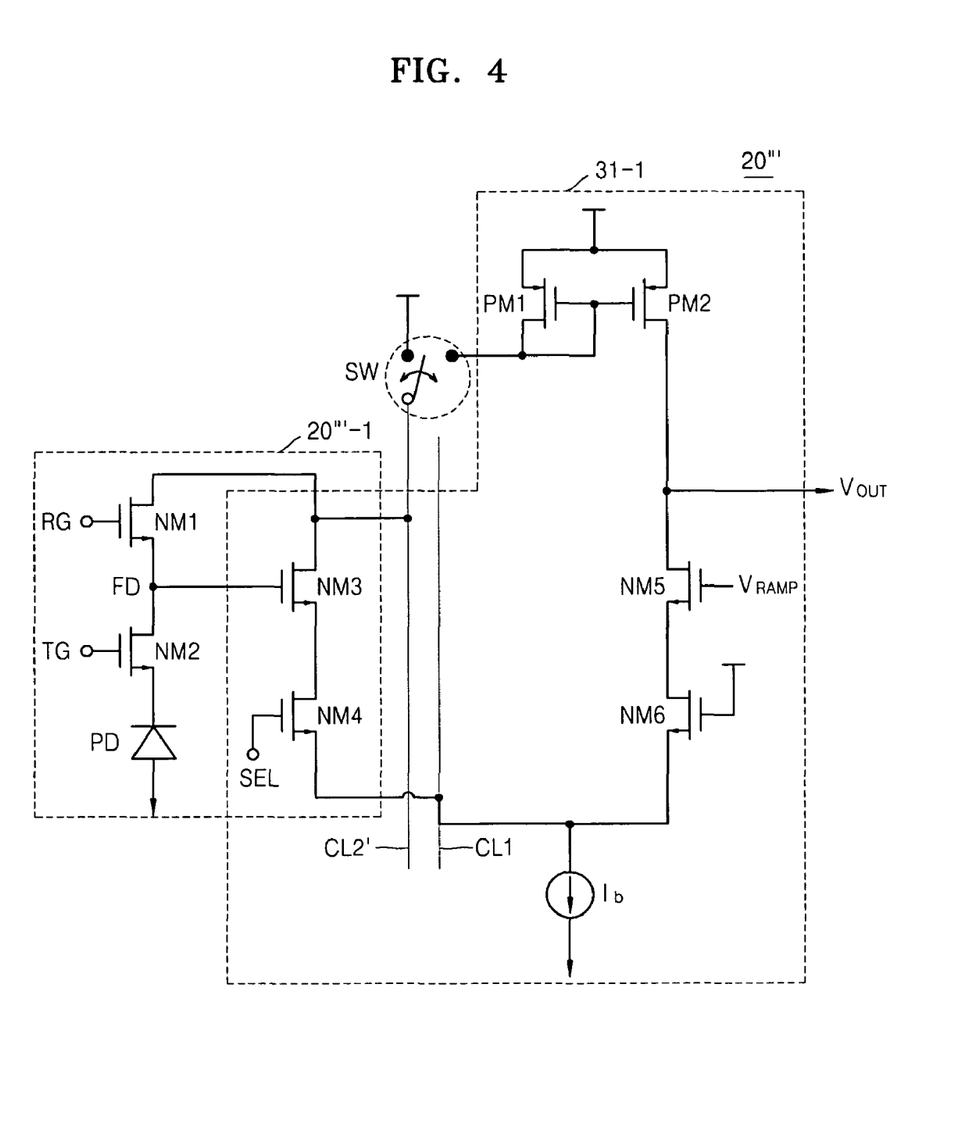
FIG. 4 is a circuit diagram of a pixel array of FIG. 1 according to another example embodiment.

FIG. 4 is a circuit diagram of pixel array according to another example embodiment. A pixel array 20'" of FIG. 4 may be the pixel array 20.

Referring to FIG. 4, the configuration of a pixel array 20'" is the same as the pixel array 20" of FIG. 3 in that the NMOS transistors NM3 and NM4 are also part of the comparator 31-1.

However, the pixel array 20'" of FIG. 4 is designed so that the column signal lines transmitting supply power to each pixel are shared together with the column signal lines transmitting the signals. Also, the NMOS transistors NM3 and NM4, connected between column signal lines CL2' and CL1, and the NMOS transistors NM5 and NM6, having a differential pair structure, are arranged in parallel between each current mirror circuit (PM1 and PM2) and the bias current source Ib.

Accordingly, a switch SW is added to the column signal line CL2' so as to divide the column signal line CL2' into sections for supplying power and transmitting the signals of the comparator 31-1.

In order to emit the electric charges stored in the FD node, the switch SW is operated to connect a supply power terminal to the column signal line CL2', while the FD node is reset to the supply power level. In addition, when the comparator 31-1 is operating, the switch SW is operated to connect the column signal line CL2' to the signal line of the comparator 31-1.

Figure 5:
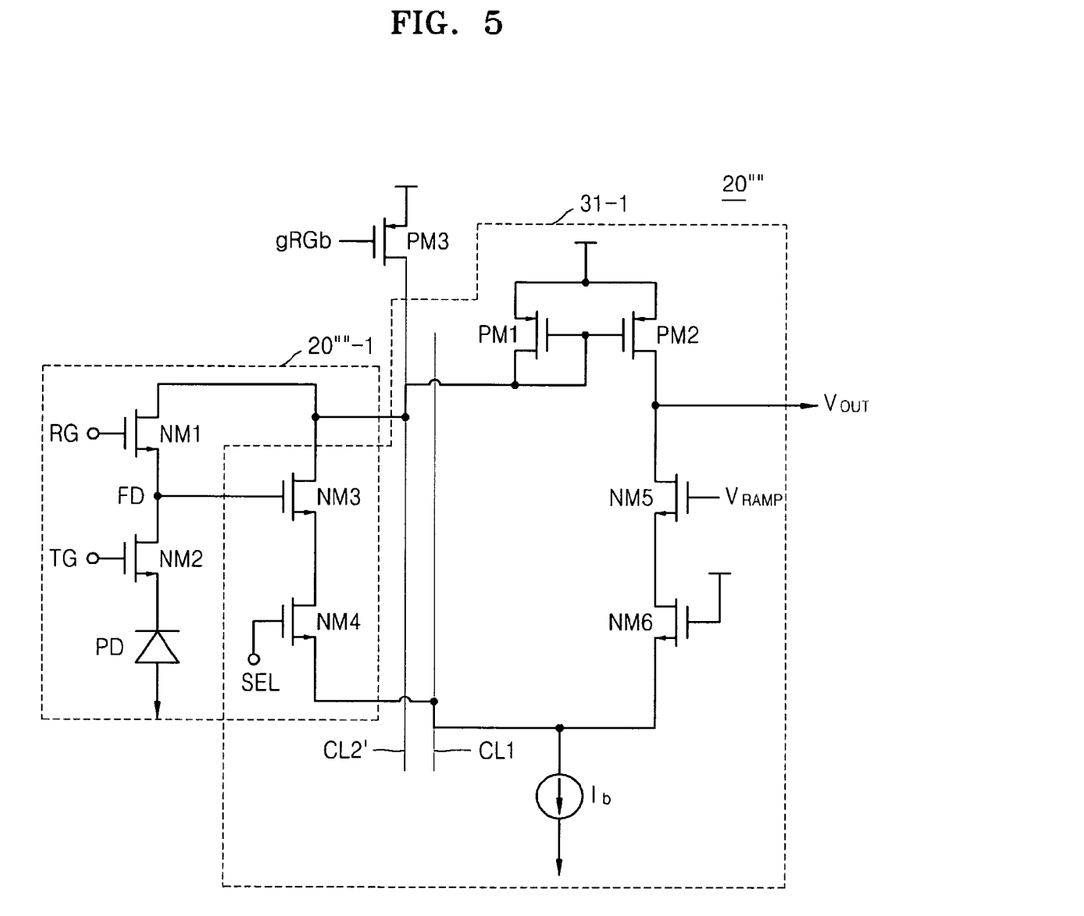
FIG. 5 is a circuit diagram of a pixel array showing a switch of FIG. 4 according to an example embodiment.

FIG. 5 is a circuit diagram of a pixel array according to another example embodiment. A pixel array 20"" is the same as the pixel array 20 except a PMOS transistor PM3 is implemented as the switching element instead of the switch SW.

Operation of the pixel array 20"" of FIG. 5 is now described in more detail with reference to a timing diagram of FIG. 6.

The timing controller 10 of FIG. 1 generates the first through fourth control signals TG, RG, SEL, and gRGb for controlling the operation of the pixel array 20.

Figure 6:
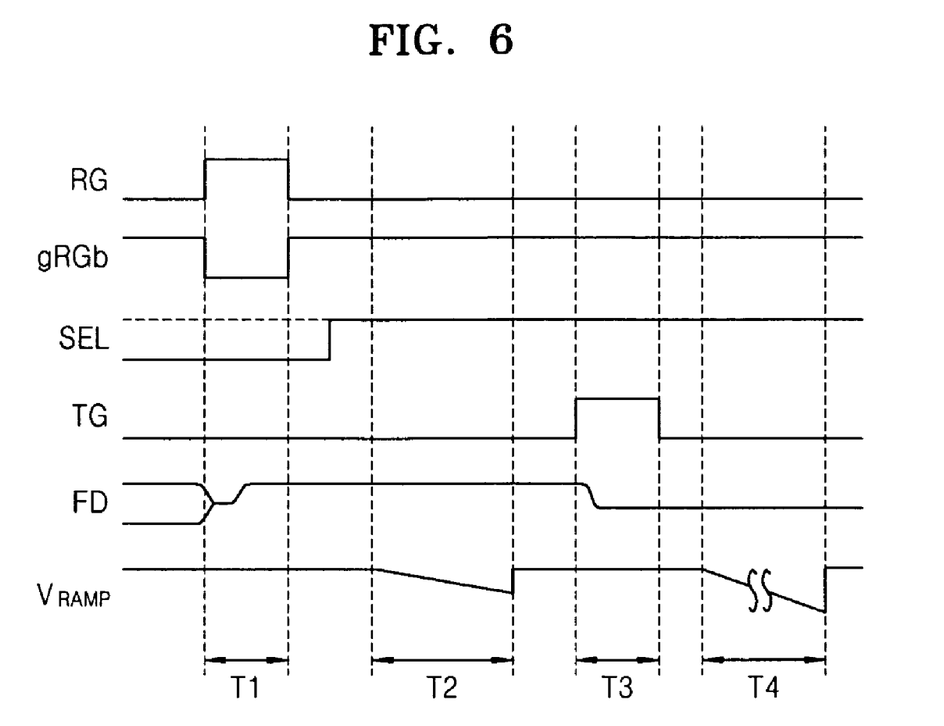
FIG. 6 is a timing diagram of signals of a pixel array according to an example embodiment.

Referring to FIG. 6, the timing controller 10 generates the first control signal TG, the second control signal RG, and the fourth control signal gRGb in a first section T1. The first control signal TG is in a logic low state, the second control signal RG is in a logic high state, and the fourth control signal gRGb is in a logic low state. In the first section T1, the third control signal SEL may be in any logic state because the comparator 31-1 does not operate during the first section T1.

Since the first control signal TG is in a logic low state, the NMOS transistor NM2 is turned off and electric charges are accumulated in the photodiode PD.

Since the fourth control signal gRGb is in a logic low state, the PMOS transistor PM3 is turned on and, thus, supply power is supplied to the column signal line CL2'. When the supply power is supplied to the column signal line CL2', the PMOS transistors PM1 and the PM2 of the comparator 31-1 are turned off and the comparator 31-1 does not operate.

Since the second control signal RG is in a logic high state, the NMOS transistor NM1 is turned on and the FD node is reset to the supply power level, thereby emitting the electric charges stored in the FD node.

The timing controller 10 generates the first control signal TG, the second control signal RG, the third control signal SEL, and the fourth control signal gRGb in a second section T2. The first control signal TG is in a logic low state, the second control signal RG is in a logic low state, the third control signal SEL is in a logic high state, and the fourth control signal gRGb is in a logic high state.

Since both the first signal TG and second signal RG are in a logic low state, the NMOS transistors NM1 and NM2 are turned off and thus the FD node sustains an electric potential.

Since the fourth control signal gRGb is in a logic high state, the PMOS transistor PM3 is turned off and thus the column signal line CL2' and the supply power terminal are blocked. In addition, since the third control signal SEL is in a logic high state, the NMOS transistor NM4 is turned on. Also, the ramp signal $V_{RAMP}$ is generated and is input to a gate terminal of the NMOS transistor NM5, so that the comparator 31-1 starts operating.

Accordingly, in the second section T2, the voltage of the FD node is compared with the voltage of the ramp signal $V_{RAMP}$. The voltage of the output signal Vout, corresponding to a comparison result of the voltages of the FD node and the ramp signal $V_{RAMP}$, is generated.

The timing controller 10 generates the first control signal TG, the second control signal RG, the third control signal SEL, and the fourth control signal gRGb in a third section T3. The first control signal TG is in a logic high state, the second control signal RG is in a logic low state, the third control signal SEL is in a logic high state, and the fourth control signal gRGb is in a logic high state.

Since the first control signal TG is in a logic high state and the second control signal RG is in a logic low state, the NMOS transistor NM2 is turned on and the NMOS transistor NM1 is turned off. Accordingly, electric charges accumulated in the PD are transmitted to the FD node.

Also, since the fourth control signal gRGb is in a logic high state, the PMOS transistor PM3 is turned off and thus, the column signal line CL2' and the supply power terminal are blocked. In addition, since the third control signal SEL is in a logic high state, the NMOS transistor NM4 is turned on. Accordingly, the comparator 31-1 operates normally. However, the ramp signal $V_{RAMP}$, which is to be applied to an input terminal of the comparator 31-1 (a gate terminal of the NMOS transistor NM5), is not generated.

The timing controller 10 generates the first control signal TG, the second control signal RG, the third control signal SEL, and the fourth control signal gRGb in a fourth section T4. The first control signal TG is in a logic low state, the second control signal RG is in a logic low state, the third control signal SEL is in a logic high state, and the fourth control signal gRGb is in a logic high state.

Since both the first control signal TG and the second control signal RG are in a logic low state, the NMOS transistors NM1 and NM2 are turned off and thus the FD node sustains an electric potential.

In addition, since the fourth control signal gRGb is in a logic high state, the PMOS transistor PM3 is turned off and thus the column signal line CL2' and the supply power terminal are blocked. Also, since the third control signal SEL is in a logic high state, the NMOS transistor NM4 is turned on. Moreover, the ramp signal $V_{RAMP}$ is generated and is input to a gate terminal of the NMOS transistor NM5.

Accordingly, in the fourth section T4, the voltage of the FD node is compared with the voltage of the ramp signal $V_{RAMP}$. The voltage of the output signal Vout, corresponding to the comparison result of the voltages if the FD node and the ramp signal $V_{RAMP}$, is generated.

As described above, power wirings and signal wirings are designed to be shared. Accordingly, the same number of wirings as in FIG. 2 are used and thus, power consumption, dynamic range of the signals, noise characteristics, and speed may be improved.

As such, the output signal Vout is used to convert the analog signal sensed in the first node of the unit pixel into digital data in the A/D converter 30 of FIG. 1.

That is, counting is started in the counter array 32 in second section T2, where the ramp signal $V_{RAMP}$ is generated. A first counting value, which is counted until the output signal Vout having a first logic value is generated, is stored in the buffer 40. The output signal Vout having a first logic value is generated at the time when the voltage of the ramp signal $V_{RAMP}$ starts decreasing below the voltage of the signal sensed in the FD node of the pixel array 20.

In addition, counting is newly started in the counter array 32 in the fourth section T4, where the ramp signal $V_{RAMP}$ with the output signal Vout having a second logic value is generated. A second counting value, which is counted until the output signal Vout having the first logic value is generated, is stored in the buffer 40. The output signal Vout having the first logic value is generated when the voltage of the ramp signal $V_{RAMP}$ is below the voltage of the signal in the FD node.

Accordingly, the first counting value and the second counting value for each pixel are stored in the buffer 40. The timing controller 10 generates a control signal CTL_R which is used to receive information R_D for generating digital pixel data. The timing controller 10 receives the information R_D from the buffer 40 according to the control signal CTL_R. The information R_D may include the first counting value and the second counting value for each pixel. The timing controller 10 uses the received information R_D from the buffer 40, which includes the first counting value and the second counting value for each pixel, to generate digital pixel data. In other words, the timing controller 10 calculates the difference between the second counting value and the first counting value for each pixel and generates digital pixel data based on its corresponding pixel.

Referring to FIG. 6, the electric charges accumulated in the photodiode PD of each unit pixel 20''''-1 in the pixel array 20 is transmitted to the FD node in the third section T3 of a frame period. Accordingly, when the electric charges are accumulated in the photodiode PD in one frame time unit, saturation may occur.

The timing controller 10 generates the first through fourth control signals TG, RG, SEL and gRGb for discharging the photodiode PD periodically in a frame unit, in order to control the accumulation period of the electric charges in PD.

In other words, the first control signal TG in a logic high state, the second control signal RG in a logic high state, and the fourth control signal gRGb in a logic low signal are generated together based on a timing discharge of the photodiode PD initially set in the section where the comparator 31-1 does not operate in the same column of the pixel array 20 in one frame period.

Since both first control signal TG and second control signal RG are in a logic high state, the NMOS transistors NM1 and NM2 are turned on. In addition, since the fourth control signal gRGb is a logic low state, supply power is supplied to the column signal line CL2'. Accordingly, the photocharges accumulated in the photodiode PD are discharged to the FD node. Since supply power is supplied to the column signal line CL2', the photodiode PD is discharged and, thus, the comparator 31-1 does not operate, the PD discharging section is set in a section where the comparator 31-1 does not operate.

For reference, the section from the time when discharge of the photodiode PD is completed to the start of the third section T3 in FIG. 5 corresponds to accumulation section in the PD.

While example embodiments have been particularly shown and described, it will be understood that various changes in form and details may be made therein without departing from the spirit and scope of the following claims.

What is claimed is:

1. A pixel sensor array comprising:
a photoelectric transformation element configured to generate electric charges in response to incident light;
a signal transmitting circuit configured to output the electric charges accumulated in the photoelectric transformation element to a first node based on a first control signal, change an electric potential of the first node to an electric potential of a second signal line based on a second control signal, and output a signal sensed in the first node to a first signal line based on a third control signal;
a switch element configured to connect or block a supply power terminal to the second signal line based on a fourth control signal; and
a comparator connected to the first signal line and the second signal line and configured to compare a voltage of the signal and a voltage of a reference signal,
wherein the switch element is configured to connect the supply power terminal to the second signal line and block current supplied from the comparator to the second signal line during a reset section, and connect the comparator to the second signal line and block the supply power terminal from the second signal line during a comparator operating section.

2. The pixel sensor array of claim 1, wherein the photoelectric transformation element includes a photodiode (PD).

3. The pixel sensor array of claim 1, wherein the signal transmitting circuit includes:
a first transistor connected to the photoelectric transformation element and the first node, and configured to output the electric charges accumulated in the photoelectric transformation element to the first node based on the first control signal;
a second transistor connected to the first node and the second signal line, and configured to change the electric potential of the first node to the electric potential of the second signal line based on the second control signal;
a third transistor connected to the first node and the second signal line, and configured to output the signal from the first node to a fourth transistor;
and the fourth transistor connected to the third transistor and the first signal line, and configured to output the signal to the first signal line based on the third control signal.

4. The pixel sensor array of claim 1, wherein the switch element includes a transistor connected to the second signal line and the supply power terminal and configured to connect the second signal line and the supply power terminal based on the fourth control signal.

5. The pixel sensor array of claim 1, wherein the switch element includes a PMOS transistor having a source terminal, a drain terminal and a gate terminal, wherein the source terminal is connected to the supply power terminal, the drain terminal is connected to the second signal line and the fourth control signal is input to the gate terminal.

6. The pixel sensor array of claim 1, wherein in the comparator includes,
a current mirror circuit connected between the first signal line and the second signal line, and
a first plurality of transistors having a differential pair structure and arranged in parallel between the current mirror circuit and a bias current source.

7. The pixel sensor array of claim 6, wherein the current mirror circuit includes a second plurality of transistors connected between the first signal line and the second signal line.

8. The pixel sensor array of claim 7, wherein the reference signal is applied to a gate terminal of one of the first plurality of transistors.

9. An image sensor comprising:
a timing controller configured to generate at least first, second, third and fourth control signals for sensing an optical image and converting the optical image into digital image data;
a pixel sensor array including,
a photoelectric transformation element configured to generate electric charges in response to incident light,
a signal transmitting circuit configured to output the electric charges accumulated in the photoelectric transformation element to a first node based on the first control signal, change an electric potential of the first node to an electric potential of a second signal line based on the second control signal, and output a signal sensed in the first node to a first signal line based on the third control signal,
a switch element configured to connect a supply power terminal to the second signal line based on the fourth control signal, and
a comparator connected to the first signal line and the second signal line and configured to compare a voltage of the signal and a voltage of a reference signal; and
an analog-to-digital converter configured to convert the signal sensed in the first node of the pixel sensor array into digital data using a signal output from the comparator,
wherein the switch element is configured to connect the supply power terminal to the second signal line and block current supplied from the comparator to the second signal line during a reset section, and connect the comparator to the second signal line and block the supply power terminal from the second signal line during a comparator operating section.

10. The image sensor of claim 9, wherein the pixel sensor array includes,
a plurality of pixel units, wherein each of the plurality of pixel units includes the photoelectric transformation element, the signal transmitting circuit, the switch element and the comparator, the switch element including a plurality of transistors configured to connect a supply power terminal to the second signal line based on the fourth control signal.

11. The image sensor of claim 10, wherein the timing controller is configured to connect the supply power terminal with the second signal line during a pixel reset and disconnects the supply power terminal from the second signal if the comparator operates, in order to convert the signal sensed in the first node of the pixel sensor array into a digital signal.

12. An image sensor comprising:
a timing controller configured to output a plurality of control signals;
a pixel sensor array configured to receive the plurality of control signals, the pixel sensor array including a plurality of unit pixels, each of the plurality of unit pixels including, a photoelectric transformation element configured to generate electric charges in response to incident light, first and second transistors coupled to a node, the second transistor being coupled to the photoelectric transformation element and configured to supply a voltage to the node based on a first of the plurality of control signals, and a fourth transistor, configured to output a signal indicating the voltage of the node to a first signal line;

an analog-to-digital converter configured to receive a signal indicating the voltage of the node to a signal line; and a switch element configured to connect a supply power terminal to a second signal line based on a fourth of the plurality of control signals, wherein the switch element is configured to connect the supply power terminal to the second signal line and block current supplied from the comparator to the second signal line during a reset section, and connect the comparator to the second signal line and block the supply power terminal from the second signal line during a comparator operating section.

13. The image sensor of claim 12, wherein the fourth transistor is configured to output the signal indicating the voltage of the node based on a third of the plurality of control signals.

14. The image sensor of claim 12, wherein a gate of a third transistor is coupled to the node and the fourth transistor.

15. The image sensor of claim 14, wherein the third transistor is coupled to the second transistor.

16. The image sensor of claim 12, wherein the analog-to-digital converter includes a comparator array having a plurality of comparators, at least one of the plurality of comparators including, a current mirror circuit connected between the first signal line and the second signal line, and a second plurality of transistors having a differential pair structure and arranged in parallel between the current mirror circuit and a bias current source.

17. The image sensor of claim 16, wherein the current mirror circuit includes a second plurality of transistors connected between the first signal line and the second signal line.

18. The image sensor of claim 12, wherein the switch element includes a fifth transistor connected to the second signal line and the supply power terminal and configured to connect the second signal line and the supply power terminal based on the fourth of the plurality of control signals.

* * * * *